United States Patent Office 3,468,977
Patented Sept. 23, 1969

3,468,977
ARTIFICIAL DENTURE COMPOSITIONS AND THEIR PRODUCTION
Paul-Günther Brückmann, Heino Logemann, and Carlhans Süling, Leverkusen, Germany, assignors to Farbenfabriken Bayer Aktiengesellschaft, Leverkusen, Germany, a corporation of Germany
No Drawing. Filed Sept. 20, 1966, Ser. No. 580,598
Claims priority, application Germany, Oct. 5, 1965, F 47,357
Int. Cl. C08f 15/36, 29/50
U.S. Cl. 260—885     12 Claims

ABSTRACT OF THE DISCLOSURE

Superior compositions to be used in prosthodontics are prepared from a mixture of a substance (a) which is a polymer and which is preferably a mixture of two polymers such as the polymer of methacrylic acid methyl ester and the copolymer of methacrylic acid methyl ester with a small amount of a second vinyl compound, and a liquid (b) which is a monomer and consists of (1) an ester of methacrylic acid with an alcohol radical containing at least one free hydroxyl group, (2) an unsaturated polymerizable acid or its anhydride and (3) methacrylic acid methyl ester. The curing is conducted at a temperature not exceeding 100° C. The compositions do not become turbid upon use.

---

The present invention relates to artificial denture compositions for the production of dental prostheses having improved properties and characteristics and procedure for producing such dental prostheses.

According to the so-called "power-liquid process" (German Patent No. 737,058; U.S. Patent No. 2,122,306), prostheses for dental purposes are produced by polymerizing methacrylic acid methyl ester or similar polymerizable monomers in the presence of powdered polymers and radical-forming catalysts at an elevated temperature. In this process there are used plaster molds which are filled with a paste prepared from a mixture of monomeric and polymeric esters. The processing of the material are improved by using as the powder component for the "powder-liquid process" not one powder with the said additives, but a mixture of at least two polymers which differ with regard to their mean particle size and are characterized in that one powder component is a methacrylic acid methyl ester homopolymer and the other powder component is a methacrylic acid methyl ester copolymer. The mean particle size of the homopolymer component should be larger than the mean particle size of the copolymer component.

It has also been proposed to use as the liquid component a mixture consisting of methacrylic acid methyl ester and an acrylic acid and/or methacrylic acid ester which contains at least one OH group in its alcohol radical, optionally with the addition of a cross-linking agent, i.e. a compound with more than two unsaturated polymerizable double bonds (German patent application F 38,791.) In this way it is possible to prevent the dentures from becoming turbid or opaque at the points of low wall strength.

Similarly, an addition of unsaturated acids or their anhydrides has the effect that the prostheses remain clear (German patent application F 40,416).

It has now been found that the effect achieved by these two methods can be further improved and that the amount of additives can be reduced by using an acrylic or methacrylic acid ester containing at least one OH group in the alcohol radical as well as an unsaturated polymerizable acid or its anhydride.

As acrylic or methacrylic acid esters containing one free OH group in the molecule there may be mentioned, in the first place, acrylic acid hydroxyethyl ester, methacrylic acid hydroxyethyl ester, acrylic acid hydroxypropyl ester and methacrylic acid hydroxypropyl ester, i.e. acrylic or methacrylic hydroxy (lower)alkyl esters. Compounds with two OH groups are, for example, glycerino-monoacrylic acid ester and glycerino-monomethacrylic acid ester. Unsaturated polymerizable acids which may be used are primarily acrylic acid, methacrylic acid, maleic acid, itaconic acid and their anhydrides. The amount of hydroxy component to be used should preferably be within the limits of 5 to 50 percent, by weight, the amount of unsaturated acid should be between 0.2 and 20 percent, by weight, referred to the monomeric liquid. A cross-linking agent, i.e. a compound containing at least two two polymerizable double bonds in the molecule, can be added to the monomeric liquid as a further component in an amount of, preferably, 2 to 10 percent, by weight. Suitable cross-linking agents are, for example, ethylene glycol dimethacrylate and butylene glycol dimethacrylate. The monomeric liquid as well as the powder may also contain the usual resins, plasticizers or dyestuffs. The powdered component of the mixture preferably consists in known manner of a bead polymer of methacrylic acid methyl ester or a copolymer of methacrylic acid methyl ester with a small amount of a second vinyl compound. Especially good results are achieved by using a mixture of two polymers as the powder. This mixture should preferably consist of a methacrylic acid methyl ester homopolymer and a methacrylic acid ester copolymer, and the mean particle size of the homopolymer should be greater than that of the copolymer.

As copolymers there may be mentioned those methacrylic acid polymers which contain acrylic acid esters of lower alcohols, other methacrylic acid esters and butadiene as comonomers.

The molding is generally cured by known methods with the addition of a radical-forming polymerization catalyst, such as benzoyl peroxide, in a plaster mold on a water-bath at 100° C. However, the process according to the invention yields clear dentures even if curing is not carried out on a water bath at 100° C., but in a drying cabinet; with the conventional mixtures, the last-mentioned method usually leads to much stronger turbidity.

The following example is given for the purpose of illustrating the invention.

EXAMPLE 3 parts by weight of a mixture consisting of 80 parts by weight of a bead polymer of methacrylic acid ester with a mean bead diameter of 0.09 mm. and a [η]-value of 0.7 and of 20 parts by weight of a bead polymer which contains 80 parts by weight of bound methacrylic acid ester and 20 parts by weight of acrylic acid ethyl ester and has a mean bead diameter of 0.05 mm. and a [η]-value of 0.7 are mixed with 0.01 part by weight of benzoyl peroxide and one part by volume of monomeric methacrylic acid methyl ester. After thorough swelling, the mixture is kneaded and the resultant paste is filled into a denture mold in a two-part plaster cuvette. The plaster mold was previously insulated with a 2% aqueous sodium alginate solution. The closed cuvette is placed on a water bath at 20° C. which is heated to 100° C. within 30 minutes and kept at this temperature for 30 minutes. The plastic form released from the mold after cooling exhibits a milky turbidity which increases within a few days when the product is exposed to air.

When, however, the monomeric methacrylic acid methyl ester is replaced in the process described above by a mixture of:

| Parts methacrylic acid methyl ester | Parts methacrylic acid hydroxy ethyl ester | Parts methacrylic acid |
|---|---|---|
| 75 | 20 | 5 |
| 75 | 25 | |
| 70 | 20 | 10 |
| 70 | 30 | |
| 60 | 35 | 5 |
| 60 | 30 | 10 |
| 60 | 40 | |
| 55 | 40 | 5 |
| 55 | 35 | 10 |
| 55 | 45 | | the turbidity decreases as the amount of additives increases and this is brought about to a greater extent by a mixture of methacrylic acid hydroxyethyl ester and methacrylic acid than by an amount corresponding to the sum total of the two components of methacrylic acid hydroxyethyl ester by itself.

The same effect is achieved when the methacrylic acid hydroxyethyl ester is replaced with methacrylic acid hydroxypropyl ester or when acrylic acid or itaconic anhydride is used, instead of methacrylic acid.

What is claimed is:
1. A composition for use in the production of dental prostheses which comprises a major proportion of component (a) and a minor proportion of component (b),
   component (a) being a polymer of methacrylic acid methyl ester or a copolymer of methacrylic acid methyl ester with a small amount of a second vinyl compound or a mixture thereof and
   component (b) consisting of a mixture of:
      (1) an ester of acrylic or methacrylic acid with an alcohol radical, said ester containing at least one free hydroxyl group, in the amount of 5–50 percent by weight based on the monomeric liquid;
      (2) an unsaturated polymerizable acid or its anhydride in the amount of 0.2 to 20% by weight based on the monomeric liquid; and
      (3) methacrylic acid methyl ester.
2. A composition according to claim 1 wherein component (1) has a single free OH group.
3. A composition according to claim 1 wherein component (1) is an acrylic or methacrylic hydroxy (lower) alkyl ester.
4. A composition according to claim 1 wherein component (1) has two free OH groups.
5. A composition according to claim 1 wherein component (1) is glycerino-monoacrylic acid ester or glycerino-monomethacrylic acid ester.
6. A composition according to claim 1 wherein component (2) is a member selected from the group consisting of acrylic acid, methacrylic acid, maleic acid, itaconic acid and their anhydrides.
7. A composition for the production of dental prostheses having improved transparency and strength characteristics, said composition comprising a mixture of (a) and (b) in the proportions of 3 parts by weight of (a) and 1 part by volume of (b):
   (a) being a mixture consisting of 80 parts by weight of a bead polymer of methacrylic acid ester with a mean bead diameter of 0.09 mm. and a $[\eta]$-value of 0.7 and of 20 parts by weight of a bead polymer containing 80 parts by weight of bound methacrylic acid ester and 20 parts by weight of acrylic acid ethyl ester with a mean bead diameter of 0.05 mm. and a $[\eta]$-value of 0.7, and
   (b) being a mixture of
      75–55 parts of methacrylic acid methyl ester,
      20–45 parts of methacrylic acid hydroxy (lower) alkyl ester,
      5–10 parts of methacrylic acid or acrylic acid or itaconic anhydride.
8. A composition according to claim 1 wherein a cross linking agent which is a substance containing at least two polymerizable double bonds in the molecule is added to said component (b) in the amout between 2 and 10%.
9. The composition according to claim 8 wherein said cross linking agent is ethylene glycol dimethacrylate or butylene glycol dimethacrylate.
10. The composition according to claim 1 wherein at least one member selected from the group consisting of resins, plasticizers and dyestuffs is added to said component (b).
11. A process for the preparation of dental prostheses from a composition according to claim 1 which comprises adding to the mixture of said components (a) and (b) 0.01 part by weight of benzoyl peroxide, allowing the mixture to swell, kneading and placing the resulting paste into a denture mold, heating to a temperature not exceeding 100° C., cooling and removing the resulting plastic form from the mold.
12. A process of producing dental prostheses from the composition of claim 7, which comprises adding to the mixture of (a) and (b) 0.01 part by weight of benzoyl peroxide, allowing the mixture to swell, kneading to a paste and placing the paste into a denture mold, previously insulated with a 2% aqueous sodium alginate solution, heating to a temperature not exceeding 100° C., cooling and removing the resulting plastic form from the mold.

References Cited

UNITED STATES PATENTS

| 2,532,502 | 12/1950 | Joy | 260—885 |
| 2,539,376 | 1/1951 | Staudinger et al. | 260—885 |
| 2,745,817 | 5/1956 | Logemann et al. | 260—885 |
| 3,055,859 | 9/1962 | Vollmert | 260—885 |
| 3,084,436 | 4/1963 | Landry | 260—885 |
| 3,311,583 | 3/1967 | Bearden | 260—885 |

FOREIGN PATENTS 857,032   12/1960   Great Britain.

SAMUEL H. BLECH, Primary Examiner
JOHN T. GOOLKASIAN, Assistant Examiner

U.S. Cl. X.R.

264—16, 17; 265—18